United States Patent [19]
Lynn

[11] Patent Number: 5,856,640
[45] Date of Patent: Jan. 5, 1999

[54] SOUND SUPPRESSION CUSHION

[76] Inventor: B. Stanley Lynn, 621 Quail Run Rd., Aptos, Calif. 95003

[21] Appl. No.: 877,721

[22] Filed: Jun. 23, 1997

[51] Int. Cl.⁶ ....................................................... B64F 1/26
[52] U.S. Cl. ............................................ 181/218; 181/290
[58] Field of Search ..................................... 181/210, 217, 181/218, 224, 284, 286, 287, 288, 290, 291, 293, 294, 295

[56] References Cited

U.S. PATENT DOCUMENTS

| | | |
|---|---|---|
| 2,674,335 | 4/1954 | Lemmerman ............................ 181/290 |
| 3,011,584 | 12/1961 | Lemmerman et al. .................. 181/218 |
| 4,428,454 | 1/1984 | Capaul et al. ........................... 181/290 |
| 4,471,924 | 9/1984 | Lynn ........................................ 181/218 |
| 4,958,700 | 9/1990 | Schafhaupt .............................. 181/218 |
| 4,960,184 | 10/1990 | Woodward et al. ..................... 181/290 |
| 5,644,872 | 7/1997 | Perdue .................................... 181/284 |

*Primary Examiner*—Khanh Dang
*Attorney, Agent, or Firm*—William W. Burns, Esq.

[57] ABSTRACT

An element, pillow or cushion for the reduction or elimination of noise in buildings, from highways, from industrial machinery, and from airports comprising a sound transparent covering and a sound absorbent interior, the element or pillow being used singly or in properly spaced arrays.

5 Claims, 5 Drawing Sheets

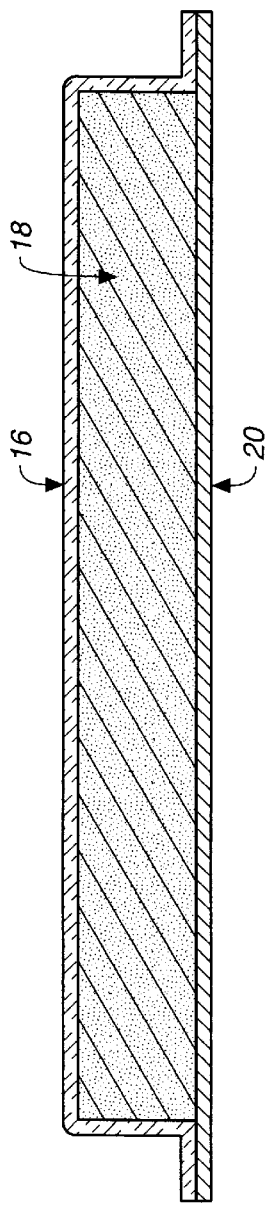
FIG._2
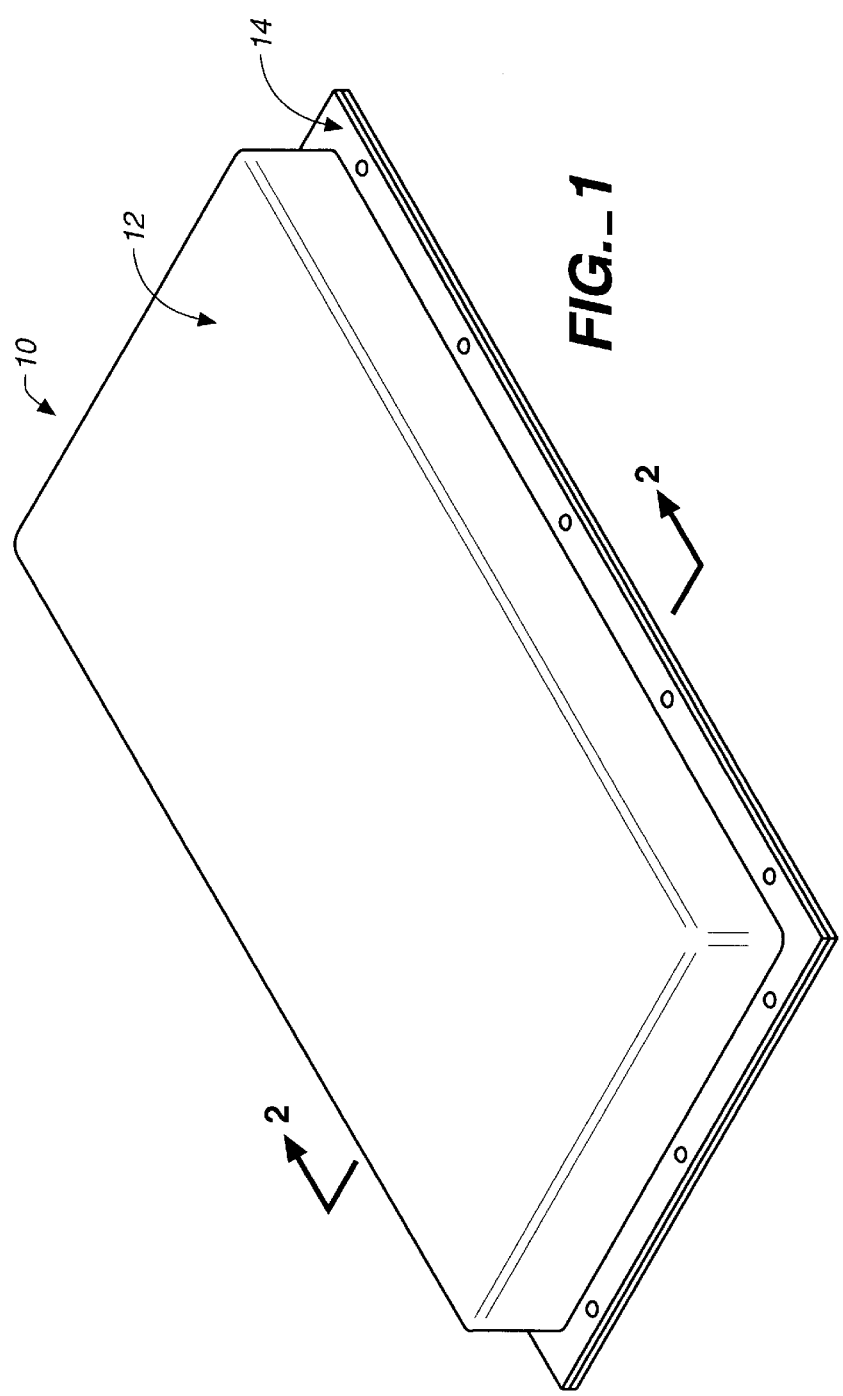
FIG._1

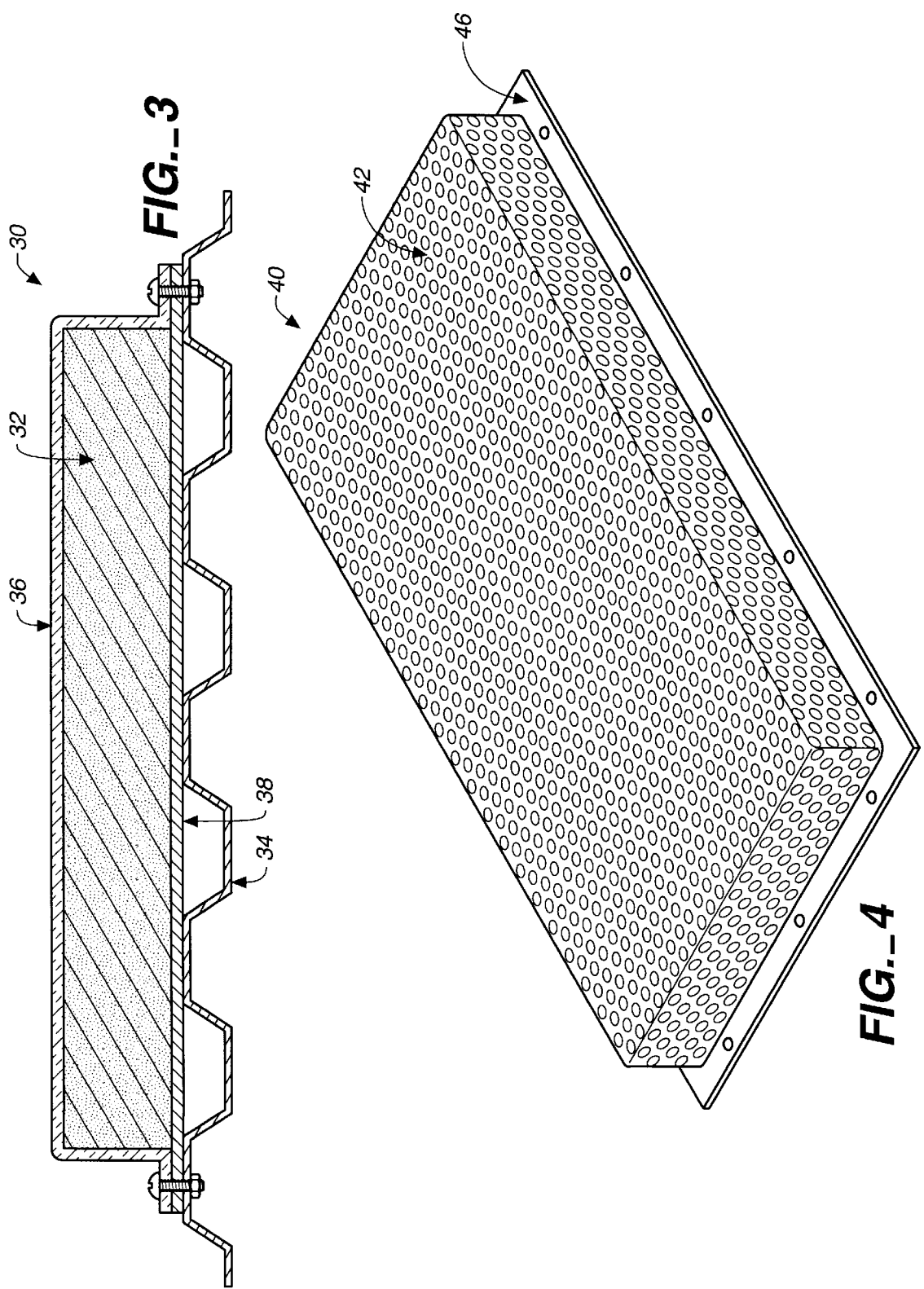

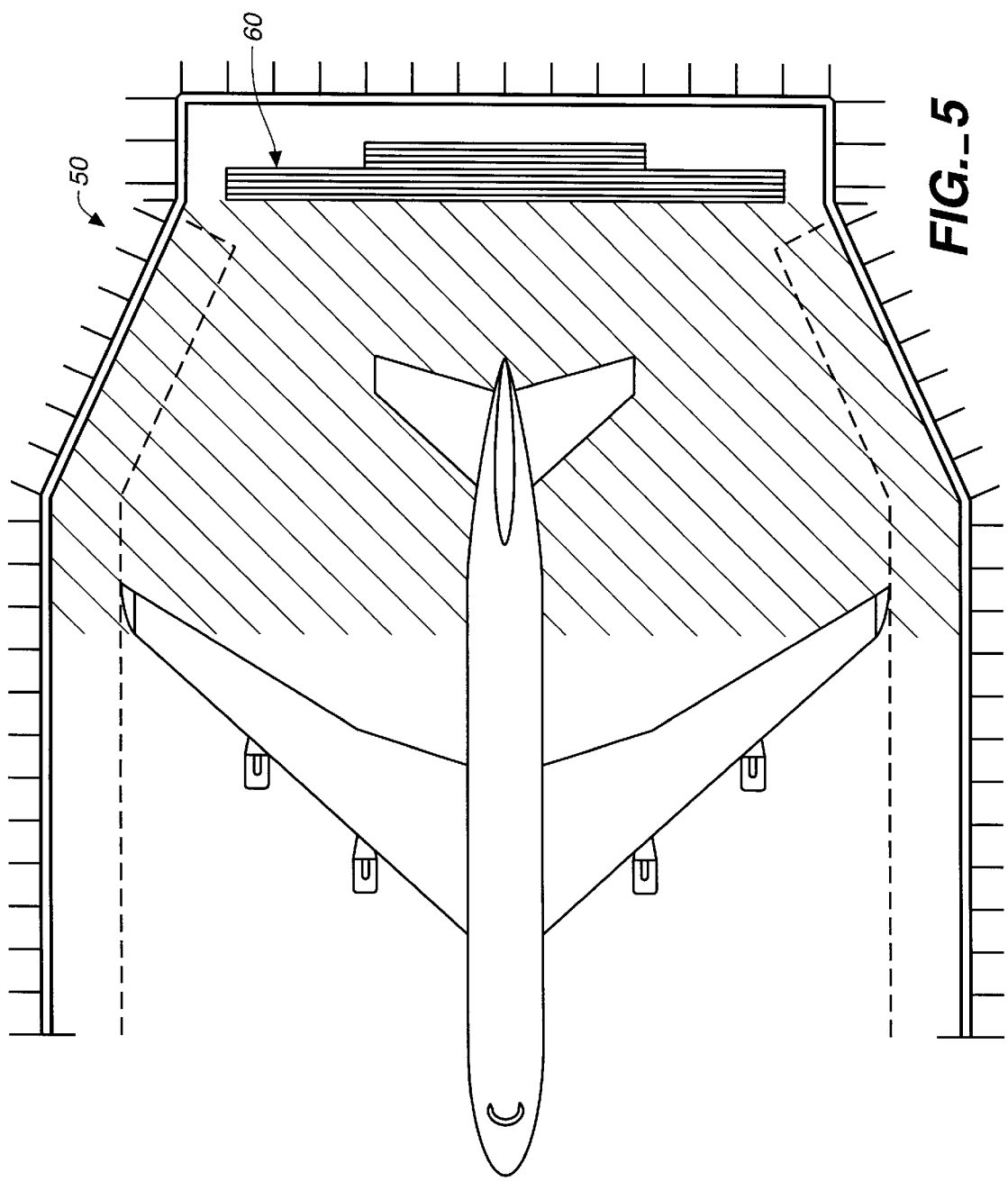
FIG._5

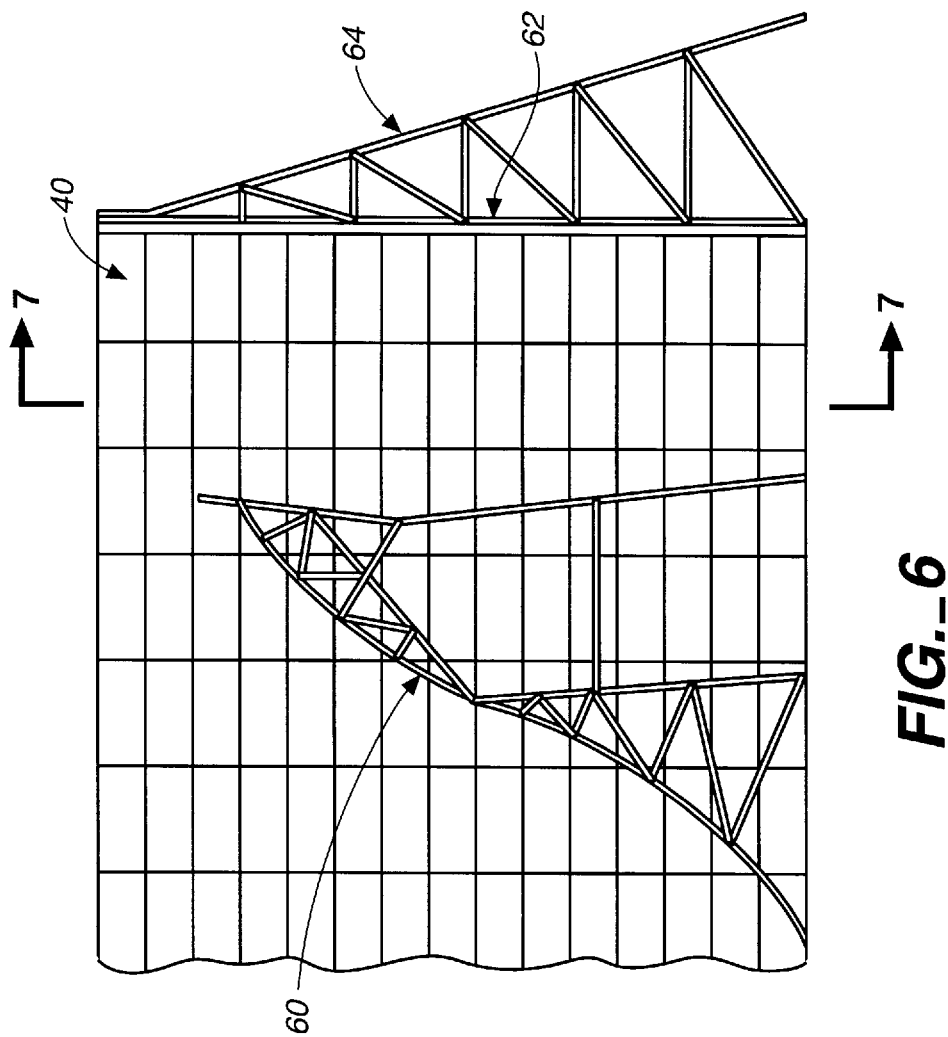
FIG._6

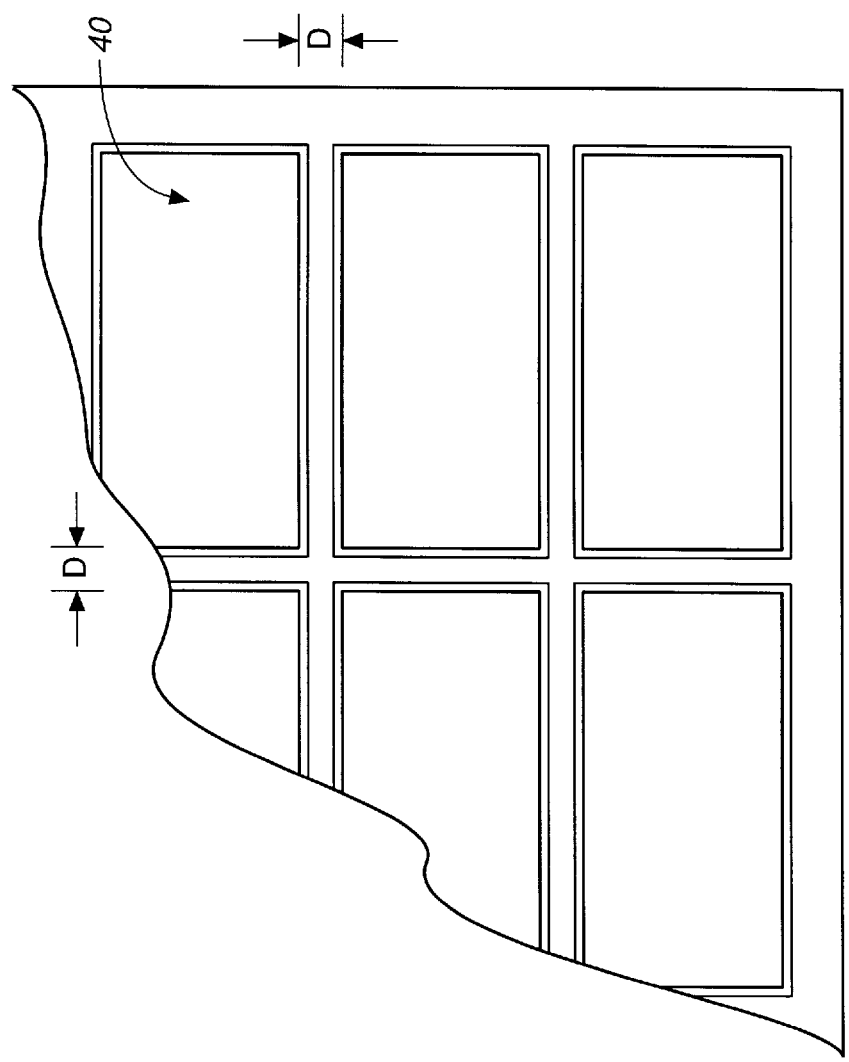
FIG._7

SOUND SUPPRESSION CUSHION

STATEMENT AS TO RIGHTS TO INVENTION MADE UNDER FEDERAL SPONSORED RESEARCH AND DEVELOPMENT:

NONE NO FEDERAL SPONSORSHIP

CROSS-REFERENCE TO RELATED APPLICATIONS:

NONE

BACKGROUND OF THE INVENTION.

I. Field of the Invention

The present invention relates to sound suppression elements or means for reduction, abatement, or suppression of annoying and harmful noise produced by crowds of people, traffic on roads, highways, and freeways, industrial machinery, or by jet aircraft during takeoff and runup at airports. The instant invention pertains to a new and improved means for noise suppression and abatement with universal application.

II. Description of Related Art

In order to properly describe the prior art related to the present invention one must look to all of the possibilities of application of the present invention. Since the present invention has a broad application, the following areas of application are considered: buildings where people congregate, and especially larger buildings such as auditoriums and sports arenas; highways and freeways; industrial applications; and airports.

In large buildings such as gymnasiums, auditoriums, sports arenas, and theatres sound suppression is often attempted with ceilings of fiberglass squares and walls that are carpeted or designed with irregular surfaces. Conventional methods absorb some of the noise, but reflect a high percentage back to the crowd or transmit the excess noise to the exterior of the building.

Suppression of freeway or highway traffic noise in populated areas is either forgotten or interrupted by growing trees and bushes along the freeways, an approach that is of limited value. Another approach is to use masonry walls along the freeways to reflect the traffic noise upwardly and away. The fault in this approach is that the noise then becomes a major annoyance for neighborhoods that are some distance from the traffic.

The noise which can be annoying, and hazardous from industrial machinery has seldom been treated. If the machinery was indoors only the building and possibly machinery housings were used to shield the sound. However, this did not effectively suppress the sound nor did it protect employees or operators.

The methods employed for suppression of noise produced by jet aircraft during jet engine runup and takeoff vary based upon the containment of the airplane. Jet engines are commonly run up to full power while on the ground to test the engines. This results in a great amount of noise and a tremendous blast of hot exhaust gases from the engines of the aircraft. The term commonly used for this activity is "engine runup". On takeoff the blast is ordinarily directed upward by blast fences that are constructed at the ends of airport runways. The blast fences reflect the gases exhausted by the jet engines, but the blast fences have very little effect upon the noise created that can be heard for miles.

During engine runup and testing, the airplanes can be contained at one location. The usual methods of sound suppression during runup and testing include containment in a ground runup enclosure (GRE). GRE's usually consist of a fence that surrounds the airplaine on at least three (3) sides. The blast from the engine is deflected by a blast fence that is placed at some distance behind the jet engines. Behind the blast fence would be disposed a wall that is considerably taller than the blast fence. The wall supports a matrix of boxes which are attached side to side and end to end to a support structure. The boxes would nominally be made of metal or concrete, rectangular in shape, have openings in the front to admit sound waves and contain a sound absorptive material, such as mineral fibre or fiberglass. Another method for suppression of sound during runup is described in U.S. Pat. No. 3,386,528. The jet engines are plugged into curved tubular deflectors which direct the jet blast and sound upward into the atmosphere. Unfortunately, a considerable amount of the noise is transmitted to distant neighborhoods. The drawbacks of these methods are higher initial cost, greater labor costs, and inefficiency of sound reduction.

The improvements embodied in the present invention address and alleviate the sound propagation problems related to crowds, traffic, machinery and airplanes. The present invention presents sound absorption implements that are considerably less expensive and more effective than existing sound absorption devices.

SUMMARY OF THE INVENTION

The general purpose of the present invention in its preferred embodiment which will be described subsequently in greater detail, is to provide a new and improved device, or implement, and method for the suppression of sound from all normal sources such as crowds, machinery, traffic, and aircraft without limatation to other sources that might be considered. In its preferred embodiment the sound suppression element appears to be a rectangular cushion or pillow shaped object that has a fibrous, flexible material covering that is transparent to noise. The interior of the cushion is comprised of a rectangular block of sound absorbent material such as fiberglass. The covering is stitched tightly around the fiberglass such that a uniform flange or lip is created around the periphery of the cushion. The cushion that is produced can then be used singly or in arrays on walls and ceilings of buildings where crowds congregate to absorb sound. The instant invention is designed to allow the sound waves to pass through the fibrous material that covers the face and sides of the cushions into the fiberglass which absorbs sound. Sound that passes through the fiberglass will be reflected, by the walls or other backing that supports the cushion, back into the fiberglass.

The sound suppression cushion of the present invention will be attached in arrays to building and ceiling walls as a means of reducing crowd noise. The retangular cushions in the preferred embodiment will be two (2) feet by four (4) feet by six (6) inches thick and will be spaced between 3 and 6 inches apart between vertical sides of respective cushions. The 6 inch spacing has been determined by experimentation to create optimal results, allowing sound waves to be absorbed through the 6 inch vertical sides of the cushion, as well as the face.

The cushion of the present invention will be used to suppress freeway noise by attachment of the cushion in geometric arrays on existing freeway walls or simple, lightweight panels or support structures that can be quickly installed at the edge of the freeways. For industrial installations, the noise from machinery that is contained in buildings can be absorbed by geometric arrays of the cushions of the present invention on walls and ceilings of the building or arrays of the cushions can be hung from ceilings. A simple box containment can also be used to protect personnel in the building if the machinery is capable of containment. An array of cushions, as previously described, would be placed on the interior walls and ceiling of the box to absorb the dangerous noise emanating from the machinery.

There has thus been outlined rather broadly the important features of the present invention in order that the detailed description thereof that follows may be better understood, and in order that the present contribution may be better appreciated. There are, of course additional features of the invention that will be described hereinafter plus other embodiments all of which will form the subject matter of the Claims appended hereto. Those skilled in the art will appreciate that the concept, upon which this disclosure is based may readily be utilized as a basis, for designing of other structures for carrying out the several purposes of the present invention. It is important, therefore that the Claims be regarded as including such equivalent construction so far as they do not depart from the spirit and scope of the present invention.

As such it is an object of the present invention to provide a new and improved implement, cushion, array, and method for suppression of sound from crowds, traffic, airports, and machinery which has all of the advantages of the prior art sound suppression implements, and methods and none of the disadvantages.

It is another object of the present invention to provide a new and improved implement, cushion, array, and method of sound suppression which may be efficiently and easily manufactured, marketed, and installed, and the components of which are easily transported to the far corners of the world.

It is a further object of the present invention to provide a single, simple sound absorption/suppression implement or cushion which can be used singly or in arrays to suppress loud, annoying, unhealthy, and dangerous noise and that may be simply, efficiently, and reliably assembled with minimum labor costs.

It is a still further object of the present invention to provide a new and improved implement, array, method, and system for sound suppression that has universal application to crowd noise, traffic noise, industrial machinery noise, and airport noise with all of the advantages and none of the disadvantages of prior implement, array, methods, or systems.

An even further object of the present invention is to provide in the implements, cushions, apparatuses, methods, arrays, and systems of the present invention greatly improved sound suppression at reduced cost as compared to the implements, cushions, apparatuses, methods and systems of the prior art while simultaneously overcoming some of the disadvantages normally associated therewith.

These together with other objects of the invention along with the various features of novelty which characterize the invention, are pointed out with particularity in the Claims annexed to and forming a part of this disclosure. For a better understanding of the invention, its operating advantages and the specific objects attained by its uses, reference should be had to the accompanying drawings, and descriptive matter in which there is illustrated preferred embodiments of the invention.

BRIEF DESCRIPTION OF THE DRAWING

FIG. 1. A perspective drawing of the basic sound suppression cushion of the present invention.

FIG. 2. A sectional side elevation of the cushion or element of the invention, FIG. 1.

FIG. 3. A sectional side elevation of a Second Embodiment of the cushion of the present invention bolted to a structually supporting Mini-V beam.

FIG. 4. A perspective drawing of the sound suppression cushion of the Third Embodiment of the present invention wherein the cushion is enclosed within a perforated rectangular sheet steel box.

FIG. 5. A top plan view of the ground runup enclosure (GRE) of the present invention with a Boeing 747 in place for engine runup and test.

FIG. 6. A sectionalized side elevation of the GRE of FIG. 5 displaying the blast fence, support structure and cushions arrayed for sound suppression upon the support structures.

FIG. 7. An array of cushions displaying the proper spacing for maximum sound absorption.

DESCRIPTION OF THE PREFERRED EMBODIMENT(S)

The instant invention presents an almost universal solution to unwanted and annoying sounds from airports, freeways, industrial sites, and without limitations, crowds of people. There are therefore numerous possible embodiments of this invention. In the preferred embodiment 10 which is depicted in FIGS. 1 and 2, the present invention appears to be a retangular block 12 surrounded by a flange or lip 14. The invention 10 is comprised of a fibrous material covering or sound transmissible cloth 16 which allows and directs full transmission of sound waves impinging on the covering 16 into an inner sound absorbent material or sound absorptive pad 18 which absorbs the sound that is transmitted through the material 16. The covering is comprised of two (2) pieces (a front 16 and a back 20) of felted thermoplastic fibers of 85% solution dyed polyprolylene fibers mixed and felted with 15% of polyethylene fibers, which are then thermally over-bonded to form a flexible clothlike material of minimum thickness of about 1/16 inch and maximum 1/8 inch. The felted material 16 is totally transparent to noise in low frequencies and also permeable to light air and liquids. The two pieces of felt material 16 and 20 are stitched in two rows around the periphery of the sound absorbent material 18 to completely restrain and slightly depress the sound absorbent material 18. The sound absorbent material 18 in the preferred embodiment is fiberglass, specifically Owens Corning #701 Fiberglas. As the sound waves travel through the sound absorbent material 18, most will be absorbed. However, some will travel through the absorbent material. For this reason, sound reflective material can be placed between the absorbent material 18 and the back covering 20 to reflect those sound waves that initially pass through the absorbent material back into the absorbent material to increase the absorption of sound. As a low cost option, inexpensive roofing paper has excellent sound reflection properties and can be added without significantly increasing the cost of the cushion.

In the preferred embodiment, the instant invention is comprised of a filled polypropylene noise transparent clothlike covering that is approximately one-eighth inch thick. Polypropylene felt has been found to have excellent properties for this application due to its porosity, however, other organic or inorganic materials can be substituted in this application. In this embodiment, which could be used to deaden the crowd noise in a gymnasium, sports dome, or auditorium, a series of rectangular 'hat' shaped cushions or pillows are arrayed for optimal sound absorption on the walls and ceilings of the building. The cushions used in this application would be comprised of a 2 foot by 4 foot by 6 inch thick core of fiberglass No. 701 Fibreglas as the sound absorber. The core would be covered (enveloped) by green felted noise-transparent polypropylene cloth that is tightly stitched. The fiberglass will be slightly compressed within the tightly sewn seams of the cloth. The hat type cushion will have a one and one-half inch flange or brim.

The cushions or elements are fastened to flush walls or ceilings by means of adhesive or other appropriate fastening means. The cushions will be spaced from three to six inches apart between upright sides of the cushions as this has been determined by experimentation and testing to be the optimal spacing to achieve maximum sound absorption so that sound waves are absorbed through the front and sides of the cushions, as well as the face of the cushion.

The first embodiment can be utilized to greatly reduce or eliminate annoying or dangerous noise from crowds, indoors and outdoors, from industrial machinery, from highways and freeways, and from other noise producing objects. The sound absorbing rectangular cushion, pillow or hat 10 of the Preferred or First Embodiment is normally utilized where there is a wall or surface to which it can be attached and supported. The cushions 10 of this embodiment can also be suspended in similar arrays from ceilings of auditoriums, churches, or other large buildings where people congregate, without structural support, to deaden sound. The 2 foot by 4 foot panels hung in this fashion (in arrays) are highly efficient in that they absorb sound from both sides through the transparent covering. For maximum sound absorption, the cushions will be spaced six inches between cushion sides.

A second embodiment 30 (FIG. 3) consists of a rectangular cushion 32 as previously described secured by bolts, pop rivets, adhesives or other suitable means, to a corrigated Mini-Vee beam 34. The corrugated beam 34 would, in turn, be bolted or welded to the steel beams of a support structure such as a series of spaced (possibly on 4 or 6 foot centers) upstanding trusses which are anchored to the ground or other surface. The cushions or pillows 30 will be spaced upon the corrugated Mini-Vee beam 34 six inches apart as described hereinabove for optimal sound absorption in the sound absorption range 500 Hz to 8,000 Hz.

In operation the sound wall or panel 30 of the Second Embodiment can be utilized whereever a free standing wall is desired, such as freeways and industrial applications. As sound from an annoying source of noise such as traffic impinges on the cushions attached to the panels, it is tranmitted through the outer covering 36 into the absorptive fiberglass material. Whatever sound that is transmitted through the absorptive material through the transmissible back covering 38, is then reflected back into the fiberglass by the corrugated surface of the Mini-Vee beam 34 to increase overall absorption of noise.

A Third Embodiment (FIG. 4) of the present invention is designed for sound suppression at airports. The sound suppression panel 40 of this Embodiment is comprised of a corrugated Mini-Vee support backing, a fiberglass cushion that is similar to that described in the First Embodiment (comprised of a polypropylene cover and a fiberglass interior), and a cage or shield 42 of perforated metal which encompasses the cushion. The shield 42 is a rectangular box-like structure with an open face and a flange 46 about the periphery of the open face. On assembly the cage or shield 42 is bolted, or by other means secured, through the mutual flanges of the cage and cushion. The sound absorption cushions of this embodiment will be constructed with the same (2 foot by 4 foot by six inch height) dimensions as used in previous Embodiments and for optimal sound absorption the cushions will be geometrically arrayed with six inch spacing. The panels 40 will be bolted in turn to spaced structural support frames that are secured to the airport apron.

In operation the sound walls or panels 40 of this Embodiment will be used to suppress the sound produced by aircraft during jet engine runup, takeoff, and travel on the ground at airports. During the runup at larger airports, jet aircraft are placed in a ground runup enclosure (GRE). There are various designs for GRE's including very expensive enclosures with concrete and metal walls and electrically actuated doors. The panels of the present Embodiment are designed for use in a functional, very low cost GRE 50 with optimal sound absorption. In the present Embodiment the sound absorbent panels with structural support comprise walls on three sides of the aircraft (FIGS. 5 and 6.)

About 40 feet to the rear of the aircraft, which might be a Boeing 747 passenger jet, is placed a blast fence 60 (see also FIG. 6) of limited height. The blast fence is placed forward of a sound wall in order to divert the hot, powerful exhaust gases which could damage the sound wall. The sound wall comprised of panels 40 of the present Embodiment will be situated 15 to 20 feet further to the rear of the blast fence. This wall will be considerably taller than the blast fence.

The sound wall will be comprised of the panels 40 of the present Embodiment which are mounted on vertical stanchions 62 that are braced by trusses 64 on four or six foot centers which are anchored to the airport apron. The panels 40 are spaced apart vertically and horizontally for optimal sound absorption. FIG. 7 displays a broken portion of the sound absorption wall to the rear of the aircraft. It has been determined through testing that the panels 40 will provide the greatest level of sound absorption when the dimension (D in FIG. 7) is between 3 and 6 inches. This allows for absorption of sound through the face and the sides of the panels 40.

The two side walls of the GRE 50 of the present Embodiment are also comprised of arrays of the panels 40 supported on vertical stanchions 62 that are supported by trusses 64 anchored to the airport apron.

In operation as the jet engines are run up to full power, the gases and blast from the huge 747 engines are deflected vertically by the blast fence 60. Noise from the engines, travels through the blast fence, through the perforations of the cages or shields 42, through the polypropylene covering and is absorbed into the fiberglass of the cushion. Sound that travels through the cushion is reflected off the corrugated panel back into the fiberglass for increased absorption.

A Fourth Embodiment (not shown) consists of a cushion which includes the same front covering as the First Embodiment, as well as, the same block of fiberglass absorption material, but varies with regard to the backing. The backing of this cushion is synthetic grass carpet, such as 'Astroturf' of one-half inch thickness. The cushion is made in the same fashion as the cushion of the First Embodiment as the felt that covers the front face is sewn to the synthetic grass carpet backing.

The Astroturf backing provides several benefits. First, the synthetic grass carpet is very stiff and allows the cushions to be used in groups and arrays to form a freestanding sound wall. Secondly, the synthetic grass carpet is highly reflective of sound such that sound is transmitted through the front face of the cushion into the fiberglass material. Noise that travels through the fiberglass is then reflected by the synthetic grass carpet back into the fiberglass for absorption.

While the invention has been described with reference to the specific embodiment described, those descriptions are only illustrative and are not to be construed as limiting the invention. With respect to the above descriptions, then, it is to be realized that the optimal dimensional relationships for the parts of the invention include variations in size, materials, shape, configurations, form, function, and manner of operation assembly and use, are deemed readily apparent and obvious to those skilled in the art and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to falling within the scope of the invention.

What is claimed as being new and desired to be protected by letters patent of the United States is as follows:

1. A three walled ground runup enclosure including a back wall and two side walls, for the reduction of the noise created by the jet engines of jet aircraft when the engines are tested in the enclosure at elevated thrust on the ground, the apparatus for reduction of noise comprising:

a) A blast deflector fence placed between the rear of the aircraft and the back wall to deflect the thrust of the jet engines upward and away from the back wall;

b) A geometric array of sound suppression elements attached to the three walls, each of said elements comprises an inner sound absorptive pad around which is wrapped a sound tranmissible cloth, said elements being spaced a minimum of 3 inches and a maximum of 6 inches apart from each other to allow the greatest amount of noise from the engines to be transmitted through the sound transmissible cloth and be reduced in the sound absorptive pads of the array.

2. The elements of claim 1 which are covered by a perforated metal covering to allow transmissions of noise into the elements while protecting the elements from high velocity jet engine exhaust.

3. The elements of claim 1 wherein the sound absorptive pad is fiberglass, and the sound transmissible cloth is comprised of felted thermoplastic fibers of 85% solution dyed polypropylene fibers mixed and felted with 15% of polyethylene fibers.

4. A geometric array of spaced, adjoining, rectangular elements for the reduction of sound from sound sources, including crowd, traffic, and aircraft noises, each element of the array comprises:

(a) A sound transmissible cloth outer covering, and (b) A sound absorptive pad which is covered by the cloth outer covering, wherein sound from a sound source is transmitted through the cloth and absorbed and reduced in the sound absorptive pad, said adjoining retangular elements being spaced a minimum of 3 inches and a maximum of 6 inches from each other to allow the greatest sound absorption by the elements in the array.

5. The element of claim 4 wherein the sound absorptive pad is composed of fiberglas, and the sound transmissible cloth is composed of polypropylene felt.

* * * * *